United States Patent Office 3,148,180
Patented Sept. 8, 1964

3,148,180
THIAZOLE AZO COMPOUNDS
James M. Straley and David J. Wallace, Kingsport, Tenn., assignors to Eastman Kodak Company, Rochester, N.Y., a corporation of New Jersey
No Drawing. Filed Nov. 28, 1962, Ser. No. 240,716
7 Claims. (Cl. 260—158)

This invention relates to novel compounds containing a dicarboximido radical, and more particularly to azo compounds, such as azo dyestuffs, containing a dicarboximido radical. Particular azo compounds containing this radical include compounds obtained by coupling diazotized 2-aminothiazoles with dicarboximidoalkyl aniline coupling components such as N-[2(N-ethyl-m-toluidine) ethyl]phthalimide.

These particular azo compounds have the general formula (I)     R—N=N—R$_1$—N(R$_2$)—R$_3$—Z wherein
R=a monocyclic 2-thiazolyl radical, that is, a radical having the general formula

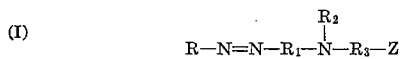

in which V is a vinylene group, including unsubstituted vinylene, mono- and di-substituted vinylene groups, such as —CH=CH—,

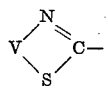

as present in 2-aminothiazole and the substituted 2-aminothiazoles described in the table below; the alkyl, trihaloalkyl, alkylsulfonyl, nitro and thiocyano substituted 2-aminothiazoles being particularly efficacious for use in preparing the azo compounds;
R$_1$=a monocyclic aromatic radical of the benzene series derived from an aminoalkylaniline coupling component and including phenylene, -m-CH$_3$C$_6$H$_3$—, i.e., m-tolylene

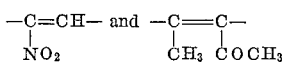

-o-CH$_3$C$_6$H$_3$—, -o-ClC$_6$H$_3$—, -m-ClC$_6$H$_3$—, -2,5-di-(OCH$_3$)C$_6$H$_2$—, -2,5-diClC$_6$H$_2$—, -o-CH$_3$C$_6$H$_3$—, etc;
R$_2$=a hydrogen atom or lower alkyl group such as straight and branch-chained lower alkyl groups including substituted lower alkyl groups, e.g., methyl, ethyl, propyl, iso-propyl, butyl, iso-butyl; hydroxyalkyl, e.g., hydroxyethyl; cyanoalkyl, e.g., cyanoethyl; alkoxyalkyl, e.g., methoxyethyl; aryloxyalkyl, e.g., phenoxyethyl; acyloxyalkyl and haloalkyl;
R$_3$=an alkylene radical straight or branch-chained, particularly lower alkylene, such as —(CH$_2$)$_n$—, wherein $n$ is a positive integer from 1 to 4, Z=a dicarboximido radical such as phthalimido, succinimido, maleimido, citraconimido, etc., as indicated in the table below, derived from the corresponding anhydride.

The 2-aminothiazoles which are diazotized and coupled with the mentioned coupling components are, for example, 2-amino-thiazole, 2-amino-5-methylsulfonylthiazole and other 2-aminothiazoles disclosed in the examples and table hereinafter.

The dicarboximidoalkyl aniline coupling components of the invention which are coupled with the diazotized 2-aminobenzothiazoles, have the following general formula (II)     H—R$_1$—N(R$_2$)—R$_3$—Z wherein R$_1$, R$_2$, R$_3$ and Z have the same meaning as given above and R$_1$ is not substituted in the diazo coupling position.

The dicarboximido radical Z of the azo compounds and coupling components of Formulas I and II above, has the following general formula

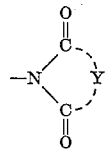

wherein Y represents the atoms necessary to complete a ring containing 4 or 5 carbon atoms in addition to the nitrogen atom, i.e., the hydrocarbon residue of the dicarboxylic acid anhydride from which the radical is derived, including substituted and unsubstituted alkylene, vinylene and ortho-phenylene groups, such as the alkylene group —CH$_2$—CH$_2$— in the succinimido radical

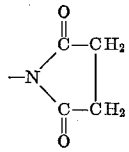

The dicarboximidoalkyl aniline coupling components are obtained as described in the following synthesis of the typical coupler N-[2(N-ethyl-m-toluidine)ethyl] phthalimide, by the condensation of a dicarboxylic acid anhydride with aminoalkylanilines.

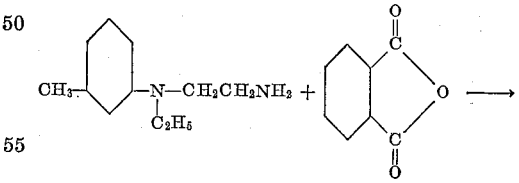

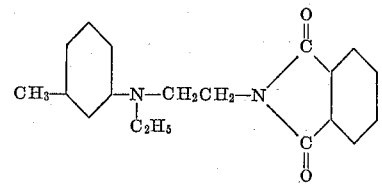

Representative 5- and 6-membered cyclic dicarboximidoalkyl aniline couplers useful for preparing the azo compounds are N-[2(N-ethyl-m-toluidine)ethyl]phthalmide
N-[2(N-ethylanilino)ethyl]succinimide
N-[2(N-ethyl-m-toluidine)ethyl]tetrachlorophthalimide
N-[2(N-butyl-m-toluidine)ethyl]succinimide
N-[2(N-ethyl-m-toluidine)ethyl]succinimide
N-[2(N-ethyl-m-toluidine)ethyl]bicyclo[2.2.1]-5-heptane-2,3-dicarboximide
N-[2(N-ethylanilino)propyl]succinimide
N-[2(N-ethyl-m-toluidine)ethyl]cyclohexane-1,2-dicarboximide
N-[2(N-ethyl-m-toluidine)ethyl]citraconimide
N-$\beta$-glutarimidoethyl-N-ethyl-m-toluidine
N-Ethyl-N-succinimidomethylaniline
N-$\alpha$-chloro-$\beta$-hydroxypropyl-N-$\beta$-succinimidoethyl-m-toluidine
N-$\beta$-acetoxyethyl-N-$\beta$-succinimidoethyl-m-toluidine
N-Ethyl-N-phthalimidomethyl-m-toluidine
N-$\beta$-maleimidoethyl-N-ethyl-m-toluidine
N-$\beta$-3-aminophthalimidoethyl-N-ethyl-m-toluidine
N-[2(N-ethyl-m-toluidine)ethyl]-1,2,3,6-tetrahydrophthalimide
N-$\beta$-3-nitrophthalimidoethyl-N-ethyl-m-toluidine
N-[2(N-ethyl-m-toluidine)ethyl]cyclohexane-1,2-dicarboximide
N-$\beta$-cyanoethyl-N-$\beta$-succinimidoethyl-m-toluidine
N-2-hydroxyethyl-N-2-succinimidoethyl-m-toluidine
N-[2(N-o-toluidine)ethyl]succinimide
N-[2(N-m-toluidine)ethyl]succinimide
N-butyl-N-$\beta$-phthalimidoethylaniline
N-methyl-N-$\beta$-succinimido-m-chloroaniline
N-$\beta$-methoxyethyl-N-$\gamma$-succinimidodropylaniline The detailed preparation of the dicarboximidoalkyl aniline couplers is described in our U.S. patent application Serial No. 232,239, filed October 22, 1962.

The azo compounds can be used for dyeing textile materials including synthetic polymer fibers, yarns and fabrics giving fast red to blue shades when applied by conventional dyeing methods to cellulose ester and polyester fibers. The azo compounds have moderate affinity for polyamide fibers and possess the valuable property of staining wool less than do previous thiazolylazo dyes. When the azo compounds are used for dyeing such hydrophobic materials, they should be free of water-solubilizing groups. In general the dyes have good fastness, for example, to light, washing, gas (atmospheric fumes) and sublimation. The dyes are useful in application and discharge printing.

The following examples will serve to illustrate the preparation of representative azo compounds of our invention.

EXAMPLE 1

*Diazotization.*—2.9 g. (0.02 m.) 2-amino-5-nitrothiazole is stirred in 60 ml. water and 32 ml. conc. sulfuric acid is added. Immediate solution results. The solution is cooled to −10° C., and a solution of 1.4 g. sodium nitrite in 16 ml. conc. sulfuric acid is added at −5° C. Stirring at −10° to −5° C. is continued for 2 hours.

*Coupling.*—5.2 g. (0.02 m.) of the coupler N-[2(N-ethyl-m-toluidine)ethyl]succinimide is dissolved in 100 ml. 15% aqueous sulfuric acid. The coupling solution is cooled in an ice-bath, and the diazonium solution is added with stirring. The mixture is coupled 2 hours at this temperature, then drowned with water, filtered, washed with water, and dried. The product dyes cellulose acetate a brilliant blue shade with good fastness properties.

The product has the formula

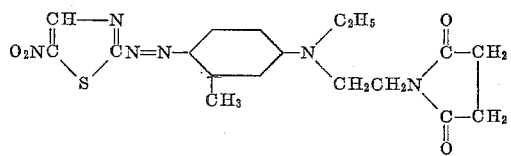

EXAMPLE 2

Example 1 procedure is carried out except using as the coupler, 6.16 g. of N-[2(N-ethyl-m-toluidine)ethyl] phthalimide. The yield is 7.5 g. of a dye imparting fast blue shades to polyester fibers as well as to cellulose acetate.

EXAMPLE 3

Example 1 procedure is carried out except using as the thiazole for diazotization, 3.36 g. of 2-amino-4-trifluoromethylthiazole. 7.1 g. of dye yielding fast bright red shades on cellulose acetate and polyester fibers is obtained.

EXAMPLE 4

Example 1 procedure is carried out except using as the thiazole for diazotization, 2.52 g. 2-amino-4-methylthiazole. The product (6 g.) dyes polyesters and cellulose acetate in red shades.

EXAMPLE 5

Example 1 procedure is carried out except using as the thiazole for diazotization, 4.42 g. of 2-amino-5-butylsulfonylthiazole. The 7.1 g. of product dyes cellulose acetate in fast bright pink shades.

EXAMPLE 6

Example 1 procedure is carried out except using as the coupler, 6.16 g. of N-ethyl-N-$\alpha$-phthalimidopropylaniline. The product dyes polyesters in fast bright blue shades.

EXAMPLE 7

Example 1 procedure is carried out except using as the thiazole for diazotization 2.5 g. of 2-amino-5-thiocyanothiazole and the coupler is 5.8 g. of N-$\beta$-cyanoethyl-N-$\beta$-succinimidoethyl-m-toluidine. The product dyes polyesters in fast bright scarlet shades.

The following table describes the azo compounds of Examples 1 to 7, as well as the azo compounds of additional Examples 8–28 which are prepared in the manner of Example 1 using the indicated diazotized 2-aminothiazoles and dicarboximidoalkyl aniline couplers wherein $R_1$, $R_2$, $R_3$ and Z refer to the general formulas above. Thus, the dye described in Example 1 of the table is made by diazotizing 2-amino-5-nitrothiazole and coupling the product with N-[2(N-ethyl-m-toluidine)ethyl]-succinimide

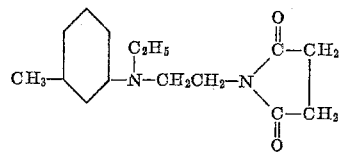

to obtain an azo compound having the formula

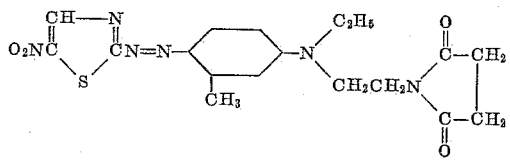

In the table the color of dyeings refers to the color obtained on dyeing cellulose acetate textile material, except for Examples 6 and 7 where a polyester textile material is used.

| Example No. | 2-Aminothiazole Diazotized | Dicarboximidoalkyl aniline coupler | | | | Color of Dyeings |
|---|---|---|---|---|---|---|
| | | Substituents on Phenylene Radical $R_1$ | $R_2$ | $R_3$ | Z | |
| 1 | 5-NO$_2$ | m-CH$_3$ | —C$_2$H$_5$ | —CH$_2$CH$_2$— | Succinimido | Blue. |
| 2 | 5-NO$_2$ | m-CH$_3$ | —C$_2$H$_5$ | —CH$_2$CH$_2$— | Phthalimido | Do. |
| 3 | 4-CF$_3$ | m-CH$_3$ | —C$_2$H$_5$ | —CH$_2$CH$_2$— | Succinimido | Red. |
| 4 | 4-CH$_3$ | m-CH$_3$ | —C$_2$H$_5$ | —CH$_2$CH$_2$— | do | Do. |
| 5 | 5-SO$_2$C$_4$H$_9$ | m-CH$_3$ | —C$_2$H$_5$ | —CH$_2$CH$_2$— | do | Pink. |
| 6 | 5-NO$_2$ | None | —C$_2$H$_5$ | —CH$_2$-CH$_2$-CH$_2$— | Phthalimido | Blue. |
| 7 | 5-SCN | m-CH$_3$ | —CH$_2$-CH$_2$-CN | —CH$_2$-CH$_2$— | Succinimido | Scarlet. |
| 8 | 5-SCN | m-CH$_3$ | —CH$_3$ | —CH(CH$_3$)CH$_2$CH$_2$— | Citraconimido | Blue. |
| 9 | 5-SCN | None | —C$_2$H$_5$ | —CH$_2$CH$_2$— | Succinimido | Violet. |
| 10 | 5-SCN | m-Cl | —C$_2$H$_5$ | —CH$_2$CH$_2$— | do | Do. |
| 11 | 5-SCN | m-OCH$_3$ | —C$_2$H$_5$ | —CH$_2$CH$_2$— | do | Blue. |
| 12 | 5-SCN | 2,5-di-OCH$_3$ | —C$_2$H$_5$ | —CH$_2$CH$_2$— | do | Do. |
| 13 | 5-NO$_2$ | m-CH$_3$ | —C$_2$H$_5$ | —CH$_2$CH$_2$— | Maleimido | Do. |
| 14 | 5-NO$_2$ | m-CH$_3$ | —C$_2$H$_5$ | —CH$_2$CH$_2$— | Nitrophthalimido | Do. |
| 15 | 4-CO$_2$C$_2$H$_5$,5-NO$_2$ | m-CH$_3$ | —C$_2$H$_5$ | —CH$_2$CH$_2$— | Succinimido | Do. |
| 16 | 4-NHCOCH$_3$ | m-CH$_3$ | —C$_2$H$_5$ | —CH$_2$CH$_2$— | do | Red. |
| 17 | None | m-CH$_3$ | —C$_2$H$_5$ | —CH$_2$CH$_2$— | do | Violet. |
| 18 | 4-CH$_3$, 5-C(O)CH$_3$ | m-CH$_3$ | —C$_2$H$_5$ | —CH$_2$CH$_2$— | do | Pink. |
| 19 | 5-CN | m-CH$_3$ | —C$_2$H$_5$ | —CH$_2$CH$_2$— | do | Violet. |
| 20 | 5-SCN | m-CH$_3$ | —C$_2$H$_5$ | —CH$_2$CH$_2$— | do | Red. |
| 21 | 5-Br | m-CH$_3$ | —C$_2$H$_5$ | —CH$_2$CH$_2$— | do | Pink. |
| 22 | 5-NO$_2$ | m-CH$_3$ | H | —CH$_2$CH$_2$— | Bicyclo[2.2.1]-5-heptene-2,3-dicarboximido | Blue. |
| 23 | 4-phenyl | m-CH$_3$ | —C$_2$H$_5$ | —CH$_2$CH$_2$— | Succinimido | Red. |
| 24 | 5-NO$_2$ | m-CH$_3$ | —CH$_2$-CH$_2$-OH | —CH$_2$CH$_2$— | Tetrachlorophthalimido | Blue. |
| 25 | 5-NO$_2$ | m-CH$_3$ | —CH$_2$-CH$_2$-CN | —CH$_2$-CH$_2$-CH$_2$— | Hexahydrophthalimido | Do. |
| 26 | 5-NO$_2$ | m-CH$_3$ | —(CH$_2$)$_2$OCH$_3$ | —CH$_2$CH$_2$— | Succinimido | Do. |
| 27 | 5-NO$_2$ | m-CH$_3$ | —(CH$_2$)$_2$OOCCH$_3$ | —CH$_2$CH$_2$— | do | Do. |
| 28 | 5-NO$_2$ | m-CH$_3$ | —CH$_2$C—OHCH$_2$Cl | —CH$_2$CH$_2$— | do | Do. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following example illustrates methods by which the azo compounds of the invention can be used to dye polyester textile materials.

0.1 gram of the dye is dissolved in the dye pot by warming in 5 cc. of ethylene glycol monomethyl ether. A 2% Igepon T and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda-ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose aliphatic carboxylic acid esters having 2 to 4 carbon atoms in the acid groups thereof, textile material which can be dyed with the new azo compounds, we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. Azo compounds having the general formula

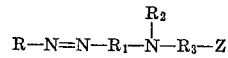

wherein

R = a monocyclic 2-thiazolyl radical,
$R_1$ = a monocyclic aromatic radical,
$R_2$ = a member of the class consisting of hydrogen, alkyl, hydroxyalkyl, alkoxyalkyl, phenoxyalkyl, acyloxyalkyl, haloalkyl, cyanoalkyl, the alkyl groups of which are lower alkyl,
$R_3$ = lower alkylene,
Z = a dicarboximido radical, said compounds being free of water-solubilizing groups.

2. Azo compounds having the general formula

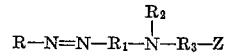

wherein

R = a monocyclic 2-thiazolyl radical,
R$_1$ = a monocyclic aromatic radical,
R$_2$ = lower alkyl,
R$_3$ = —CH$_2$CH$_2$—, and
Z = a succinimido radical, said compounds being free of water-solubilizing groups.

3. An azo compound having the formula

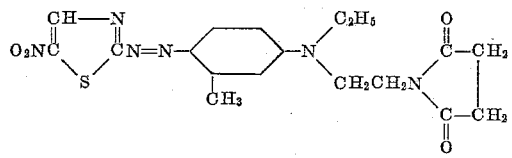

4. An azo compound having the formula

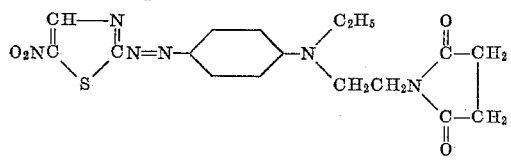

5. An azo compound having the formula

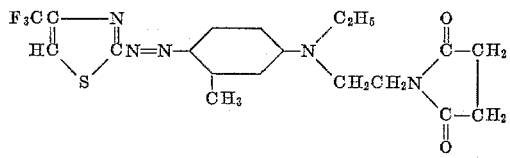

6. An azo compound having the formula

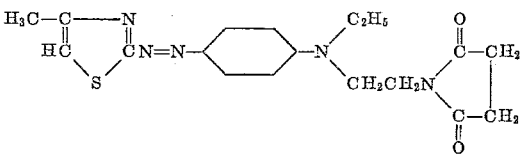

7. An azo compound having the formula

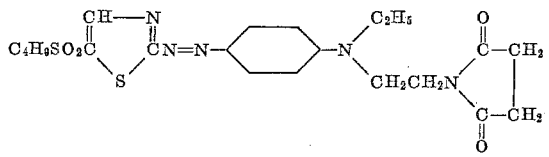

No references cited.